(12) United States Patent
Scheidt et al.

(10) Patent No.: US 7,574,497 B2
(45) Date of Patent: Aug. 11, 2009

(54) SYSTEM AND METHOD FOR AN OPEN AUTONOMY KERNEL (OAK)

(75) Inventors: David H. Scheidt, Edgewater, MD (US); David P. Watson, Severna Park, MD (US); David L. Alger, Severn, MD (US); Christopher B. McCubbin, Baltimore, MD (US); Shon D. Vick, Baltimore, MD (US)

(73) Assignee: The John Hopkins University, Baltimore, MD (US)

( * ) Notice: Subject to any disclaimer, the term of this patent is extended or adjusted under 35 U.S.C. 154(b) by 1779 days.

(21) Appl. No.: 10/344,876

(22) PCT Filed: May 30, 2002

(86) PCT No.: PCT/US02/16838

§ 371 (c)(1),
(2), (4) Date: Feb. 14, 2003

(87) PCT Pub. No.: WO02/099635

PCT Pub. Date: Dec. 12, 2002

(65) Prior Publication Data

US 2003/0182354 A1    Sep. 25, 2003

Related U.S. Application Data

(60) Provisional application No. 60/295,201, filed on Jun. 1, 2001.

(51) Int. Cl.
*G06F 15/173*    (2006.01)
*G06F 15/177*    (2006.01)

(52) U.S. Cl. ............ 709/223; 709/220; 709/221; 709/224

(58) Field of Classification Search .......... 709/220–227
See application file for complete search history.

(56) References Cited

U.S. PATENT DOCUMENTS

| 5,655,081 A | 8/1997 | Bonnell et al. ............... 395/200 |
| 5,822,585 A | 10/1998 | Noble ......................... 395/680 |
| 5,958,010 A | 9/1999 | Agarwal ....................... 709/224 |
| 5,963,447 A | 10/1999 | Kohn ......................... 364/148.04 |
| 6,049,819 A | 4/2000 | Buckle et al. ............... 709/202 |
| 6,393,386 B1 * | 5/2002 | Zager et al. .................. 703/25 |

OTHER PUBLICATIONS

A Model-Based Approach to Reactive Self-Configuring Systems, in Proceedings of AAAI-96 by B. Williams + P. Nayak.

* cited by examiner

*Primary Examiner*—William C Vaughn, Jr
*Assistant Examiner*—Carlos R Perez Toro
(74) *Attorney, Agent, or Firm*—Albert J. Fasulo, II

(57) ABSTRACT

The Open Autonomy Kernel (OAK) addresses critical infrastructure requirements for next generation autonomous and semi-autonomous systems (24), including performance tracking, anomaly detection, diagnosis, fault recovery, and plant "safing". OAK combines technologies in automated planning and scheduling, control agent-based systems (22), and model based reasoning to form a portable software architecture (26), knowledge-base, and open Application Programming Interface (API) to enable integrated auxiliary subsystem autonomy.

5 Claims, 3 Drawing Sheets

SYSTEM AND METHOD FOR AN OPEN AUTONOMY KERNEL (OAK)

CROSS-REFERENCE TO RELATED APPLICATIONS

This application claims the benefit of U.S. provisional application No. 60/295,201, filed on Jun. 1, 2001, which is hereby incorporated by reference in its entirety.

STATEMENT OF GOVERNMENTAL INTEREST

This invention was made with U.S. Government support under the Office of Naval Research, Arlington, Va. under contract number N00014-00-C-0050. The U.S. Government has certain rights in the invention.

BACKGROUND OF THE INVENTION

Efforts to automate the control of complex connection-based systems such as, for instance, engineering plants aboard naval vessels have emphasized the infrastructure and diagnostic aspects of plant management, i.e., monitoring subsystems via sensors and presentation of the sensor data to human operators. Interpretation of and response to the data remain largely manual tasks. This interpretation and response function, especially in damage control scenarios, is a significant factor in determining manpower levels. If the incident assessment and response loop can be closed with a reliable autonomous reasoning process, significant relief in overall manpower levels can be realized. The best automation efforts to date have been based on expert diagnostic knowledge in the form of coded rules or procedures that are interpreted by the system at runtime to detect, predict, or diagnose fault conditions. However, even the best automation efforts require significant amounts of human diagnosis and input.

SUMMARY

The open autonomy kernel (OAK) architecture of the present invention extends an automated reasoning paradigm in a number of important ways. First, OAK is based upon the belief that the next evolutional step in complex system automation involves goal-directed commanding at the system component level. This shifts the control paradigm from one of sending commands to subsystems, to sending goals and resources to intelligent subsystem management control agents that require minimal, if any, direct operator interaction. Secondly, subsystem management control agents are loosely coupled across a distributed, networked infrastructure. This results in a dynamic and adaptable coordination capability, leading to a more survivable overall system architecture. Finally, OAK uses declarative model-based reasoning as an extension to current rule and procedure based formalisms in the control agent control loop. Qualitative model-based reasoning provides the unique potential for performing real-time detection, identification, and diagnosis of unanticipated fault conditions.

OAK is based upon an open control agent communication infrastructure that includes a plurality of control agents coupled with respective subsystems. Control agents communicate via a messaging protocol that permits them to share their subsystem status and subsystem goals with other control agents. Status and goal data allows control agents to collaborate in diagnosis, prediction, or event response scenarios. The OAK infrastructure further supports the notion of a command element that can control and establish goals for the control agents. The command element may be a human operator, an outside control agent, an external software system, or the control agent community.

DETAILED DESCRIPTION

Figure 1:
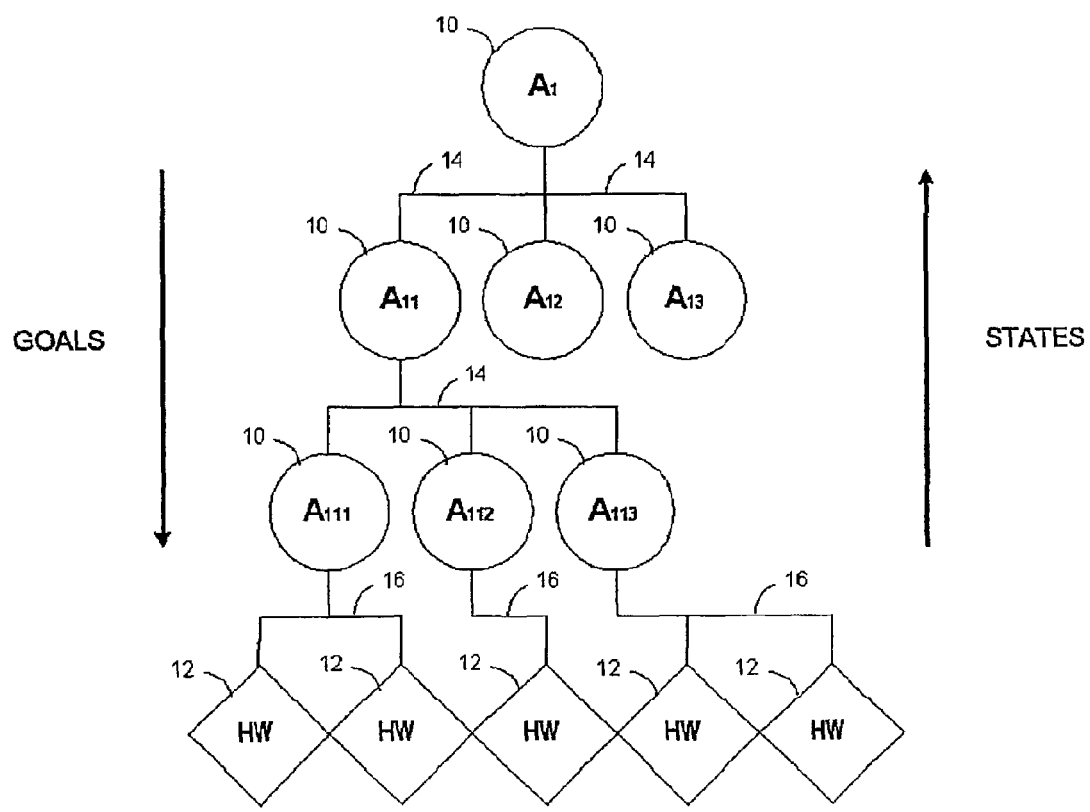
FIG. 1 illustrates one example of a logical OAK hierarchy.

The open autonomy kernel (OAK) provides a goal-directed coordinated intelligence approach with respect to complex connection-based system architectures. Connection-based systems can be thought of as physical or logical systems that are comprised of well defined components whose behavior is influenced by other well defined components along one dimensional paths. Examples of connection-based systems include, but are not limited to, electrical systems, plumbing systems, and computer networks. In addition, connection-based systems can be combinations of functionally distinct but interdependent system components such as an electrical system, a plumbing system, and a computer network that are components of, for instance, an overall engineering plant management system.

The term "components" includes both physical hardware components such as, but not limited to, a valve, a circuit, or a switch, as well as a cohesive collection of such hardware components, such as, but not limited to, a pumping station, an electrical substation, or a power grid. Components may also refer to a hardware/software combination that behaves as a distinct unit (e.g., a valve and its controller). Components may also comprise other more detailed components. A key distinction is that the behavior of an individual component is easily defined from the perspective of peer components interacting with the individual component.

OAK provides intelligent support for three key features pertaining to overall system control: estimation, communication, and control. The primary building blocks of an OAK system architecture include control agents (CA), model-based reasoning engines (MBRE), control agent communications brokers (ACB), and control mediators (CM).

OAK utilizes two key technologies to perform the aforementioned functions. First, control is distributed through the use of control agent-based software. Secondly, OAK implements intelligent reasoning within each control agent using a technology known as Model-Based Reasoning (MBR). A primer of control agent based software and model-based reasoning as related to the present invention is included to facilitate a better understanding of the present invention.

Control Agent Based Software

A control agent is an independently executing controller that is coupled to and responsible for an identifiable subsystem within a larger system, that is, at least in part, controlled by other peer control agents. A control agent is capable of perceiving changes in the subsystem, identifying the state of the subsystem, planning actions in accordance with the current subsystem state and/or desired subsystem goals, and executing planned actions.

OAK control agents are intrinsically permanent, stationary, exhibit both reactive and deliberative behavior, and are declaratively constructed. Control agents are reactive in their ability to reconfigure the subsystems within their control in the context of an existing task plan. Control agents are deliberative in their ability to create a task plan in response to observed states and defined goals. OAK control agents' extrinsic characteristics include proximity to the controlled subsystem, social independence, and both awareness of and cooperativeness with goals and states of other control agents. OAK control agents are comprised of nearly homogeneous control agents, and are independently executed yet contain unique models of the subsystem for which the control agent is responsible. OAK control agents are environmentally aware and behavior of the environment is predictable through each control agent's model.

Model-based Reasoning

OAK control agents employ Model-based Reasoning (MBR) to deduce the condition of their underlying subsystems. Model-based reasoning, as applied to OAK, can be thought of as:

reasoning about a subsystem's behavior from an explicit model of the mechanisms underlying that behavior. Model-based techniques can very succinctly represent knowledge more completely and at a greater level of detail than techniques that encode experience, because they employ models that are compact axiomatic systems from which large amounts of information can be deduced.

In OAK, a particular flavor of MBR called "Qualitative Model-Based Reasoning" is used. This branch of MBR focuses upon using symbolic (rather than quantitative) representations of system behavior in order to simplify the modeling process and enable reactive-level response times. First, Model-based programming techniques are used to develop a set of qualitative, first-principles component models for elements of the controlled system. Multiple instances of these component models are combined to produce larger aggregate models of an entire system. Then, these aggregate models are used at runtime by an MBR kernel to produce system diagnoses. This kernel is able to resolve complex system-level interactions between components to produce a best estimate of system state. By placing the responsibility of resolving these complex interactions upon the MBR kernel, the human modeler is freed from having to explicitly reason through and encode all possible diagnosis a priori.

First Principles Modeling

First principles models are interconnected finite state automata (FSA) in which interactions among connected FSA are explicitly enumerated by associating attributes used to define states. Model-based reasoning (MBR) is state estimation or planning of first principles models based upon resolving conflicts between state definitions and the values of attributes used to define states.

Discrete event system theory shows that systems may be modeled using an automaton $G=(X, E, f, \Gamma, x_o, X_m)$, in which X is the set of discrete states, or state space; E is the finite set of events; $f$ is the transition function; $\Gamma$ is the active event function mapping X to E; $x_o$ is the initial state and $X_m$ is the set of marked states. Control of G is provided by a control policy that includes a set of control actions.

Automata that are memoryless are considered Markov Processes. Association of control actions, costs and probabilities with state transitions allows us to derive Markov Decision Processes (MDP). MDP are defined by the tuple $(X_S, C, E_C, f_T, R)$ in which: $X_S$ is the finite set of states of the system being tracked; C is the set of possible commands of which c is an element (c∈C); $E_C$ is a finite set of commanded events described in the form $(x_I, c, x_F)$ where $x_I$ is the initial state and $X_F$ is the final state; $f_T$ is a state transition model of the environment which is a function mapping $X_S \times E_C$ into discrete probability distributions over $X_S$, and R is the cost function over $E_C$. The actions are non-deterministic, so we write $f_T(x, e)$, in which $(x \in X_S)$ and $(e \in E_C)$, for the probability that transition e will occur given the current state x.

OAK is required to reason with the possibility of component failures, so the commanded event set $E_C$ is replaced by the set of possible events $E_P$ that includes the commanded set and the failure events $E_F$. ($E_P = E_C \cup E_F$) Note that failure events may be commanded or spontaneous, and are assumed permanent and non-recoverable. The state transition function $f_T$ is extended to $X_S \times E_P$, providing us with a failure sensitive MDP $(X_S, C, E_P, f_T, R)$.

By way of example, a failure sensitive model of a simple circuit breaker may be described as follows:

M(breaker):
$X_S$: {open, shut, stuck-open, stuck-shut}
C: {open, shut, none}
$E_P$: {(open, shut, shut), (shut, open, open), (open, shut, stuck-open), (open, none, stuck-shut), (shut, open, stuck-shut), (shut, none, stuck-open)}
$f_T$: ρ(open, shut, shut), ρ(shut, open, open)≅1,
ρ(open, shut, stuck-open), ρ(shut, open, stuck-shut), ≅0.01;
ρ(*, *, stuck-open), ρ(*, *, stuck-shut),≅0.0001;
R: {$r_{open}$, $r_{shut}$=1, $r_{none}$=0}

The behavior a system exhibits in state x, where $x \in X_S$, is defined by attributes. Attributes are physical properties of the system. Propositional statements containing these attributes are used to express system behavior in each state. The behavior of our circuit breaker may be defined through the following propositions:

(breaker.state=(open ∨ stuck-open))→conduct
(breaker.state=(shut ∨ stuck-shut))→¬conduct Because internal sensors are subject to faults, and the measure of a system is its effect on the systems it services, OAK is interested in the behavior of our system as it relates to the outside world. External influences are modeled as a special class of attributes known as interfaces. The circuit breaker has two such attributes: $current_{in}$ and $current_{out}$. Using these interfaces behavior definition propositions are rewritten as:

(breaker.state=(open ∨ stuck-open))→
($current_{in}$=$current_{out}$)
(breaker.state=(shut ∨ stuck-shut))→
(¬$current_{in}$ ∧ ¬$current_{out}$)

A system containing multiple related components may be modeled by associating component model interfaces in propositional statements declared in the system model. A system model is represented by the tuple: $M_{system}=(M_{comp}, A, P)$ in which $M_{comp}$ is a set of failure sensitive component models, A is a set of attributes defined by the system, and P is a set of propositions associating system defined attributes A and $M_{comp}$ interfaces. A small system comprised of two circuit breakers connected in series may be represented as follows:

M(system):
M($breaker_1$), M($breaker_2$): M(breaker); //defines $breaker_1$ and $breaker_2$ to be "breakers"
$breaker_1.current_{out}$=$breaker_2.current_{in}$ Partially Observable Markov Decision Processes (POMDP) are MDP that have been extended to include a finite set of observations. Failure sensitive POMDP are represented by the tuple $M=(X_S, C, E_P, O, f_T, R)$. in which O is the observation function that maps $X_S$ to the finite set of observations. However, states have been defined as abstractions represented in terms of attributes. As abstractions, states are not directly observable. The ability to observe a state is associated with the ability to observe the attributes that define the state. A state is observable if all of the attributes in any clause of a disjunctively formed state behavior definition are observable. A state may be considered partially observable if it is not observable and at least one attribute is observable. The observation function O in traditional POMDP is replaced by an observation function $O_A$ that maps the attribute set A to the finite set of observations. The probability of making an observation o from the attribute a is denoted as O(o,a).

Model Based Estimation

Estimation methods have been demonstrated for systems of components modeled as failure sensitive POMDP. The first step in estimation is to determine a belief state for the system. Assuming an initial state $X_I$ of the components, and a set of commands $c \subseteq C$ applied to the system components model-based estimation makes the naïve assumption that the most probable component transitions in $E_C$ have occurred. The belief state $X_B$ for all components is easily derived. A single propositional statement that describes the believed values of attributes within the system may be generated by conjoining the propositional clauses associated with these belief states, general propositional clauses showing component relationships and known attribute values for interfaces external to the system. For example, consider the simple two circuit breakers in series model:

M(system): {
    M(breaker$_1$), M(breaker$_2$): M(breaker);
    breaker$_1$.current$_{out}$=breaker$_2$.current$_{in}$;
    breaker$_1$.current$_{in}$=external stimulus;}
breaker$_1$.initial_state=open;
breaker$_2$.initial_state=closed;

Given the command breaker$_2$.command open and an externally provided flow (external stimulus=true) then the state set {breaker$_1$.state=open; breaker$_2$.state=open} is realized and the following propositional statement presents itself:

(external stimulus=true)∧(breaker$_1$.flow$_{in}$=external stimulus)∧(breaker$_1$.current$_{out}$=breaker$_1$.current$_{in}$)
∧(breaker$_2$.current$_{out}$=breaker$_2$.current$_{in}$)
∧(breaker$_1$.current$_{out}$=breaker$_2$.current$_{in}$).

One can see how a value for an attribute, in this case our external stimulus propagates through the system inferring values on the currents and current$_{out}$ attributes in breakers one and two.

Observed attribute values generate additional observed propositional clauses (e.g., breaker$_2$.current$_{out}$=true). If the belief state is incorrect then a conflict between the observed clause and one or more of the belief state clauses will be generated. If no conflict is generated then the belief state is confirmed. A solution to a conflict, or set of conflicts, is defined as a set of alternate transitions E that generate propositional statements that do not conflict with observation clauses. For example, in the breaker example if a single transition e: (shut, open, open) is applied to the above initial state and breaker$_2$.current$_{out}$=false is subsequently observed a conflict will be generated. If the transition set is replaced by either of the sets E={breaker$_2$.transition(shut, open, stuck-shut)} or
E={breaker$_2$.transition(shut, open, open),
    breaker$_1$.transition(open, none, stuck-shut)} these transitions will generate a belief state that does not conflict with the observation clause. Using the transitional probabilities found in the transition function $f_T$ we can apply Bayes' rule to the probabilities of our two candidate solutions to determine their relative probabilities. The generation of possible solution sets can be accomplished using Conflict-directed Best First Search (CBFS).

When multiple candidate solutions satisfy a set of conflicts, the most likely solution is selected as a basis for reconfiguration and subsequent estimation. To protect the estimation engine from permanently adopting an incorrect solution, a Truth Maintenance System is used to track likely solutions. If future observations generate clauses that provide support to alternative solutions, the TMS generates a historical revision of the belief states.

Encapsulation and Abstraction

Large systems require models that, due to their complexity, are difficult to process using CBFS and TMS. This complexity is mitigated through encapsulation, decomposition and distribution. A system may be decomposed by encapsulating portions of the system model into subsystems of modest size (<25 components). Subsystems inherit component and system semantics. The components of the system, the subsystem attributes, and the propositional statements used by the subsystem to associate components are represented by ($M_{comp}$, A, P). Subsystem automata ($X_S$, C, $E_P$, $O_A$, $f_T$, R) are associated with subordinate component automata $M_{comp}$ by defining the subsystem states $X_S$ using propositional statements over subordinate component attributes. The entire subsystem is represented by the rather large tuple $M_{sub}$=($X_S$, C, $E_P$, $O_A$, $f_T$, R, $M_{comp}$, A, P, $A_I$) in which $A_I$ is the interface set for the subsystem. This structure provides for subsystems to exhibit automaton-like behavior at an abstract level; however, it is not necessary that they do so. Subsystems that contain null sets for any or all of the abstract automata elements ($X_S$, C, $E_P$, $O_A$, $f_T$, R) are acceptable and often desirable.

If a subsystem is believed to be in a state, then the propositional statement associated with its state is applicable. Likewise if a subsystem is believed to be in a state, then the propositional statements that define the subordinate component states are also applicable. The set of applicable statements may be conjoined and reduced to create a single belief statement for the subsystem. Using the combined belief statement, CBFS and TMS may be applied to perform estimation and reconfiguration within the scope of the subsystem.

Because subsystems inherit the properties of component models, a subsystem model may be used as a component of another subsystem. This parent-child relationship permits building topologies of subsystems featuring numerous models at varying levels of abstraction. Parent-child relationships are expressed by associating the behavior, in terms of the child's interfaces and goals, within propositions internal to the parent.

Control with an independent CBFS and TMS for each subsystem is complete if and only if the subsystem behavior represented by the subsystem's proposition statement set is independent. Unfortunately this is not usually the case. A subsystem's interface attributes are, by definition, constrained to the world outside of the subsystem. This problem is limited by enforcing design constraints that remove some of the more difficult cross-subsystem dependencies. Design constraints are focused on eliminating the possibility of conflicts being generated by observations and propositional clauses that are difficult to resolve across subsystems, and also eliminating the possibility of goals being directed to a subsystem that cannot be directly addressed within the subsystem. While these constraints are limiting, experience has shown that robust, useful models are still a possibility. The design constraint is described in terms of conflicts generated during the estimation process. Because our reconfiguration strategy is a mirror of our estimation strategy, equivalent design criteria may be used to simplify reconfiguration. Conflicts may be divided into two distinct types: independent conflicts are identifiable by observation-proposition combinations that are contained within a single subsystem; dependent conflicts are generated by behavior that is not identifiable by observation-proposition combinations within a single subsystem.

Collaboration between independent subsystems is straightforward. Observations are made by independent subsystems that resolve the conflict. After the conflict is resolved the effects of the observation are propagated to the system and other subsystems via interfaces.

As previously stated, OAK is a distributed, multicontrol agent system. An OAK system can have a varying topology based on the overall system application. OAK has two major use-cases that almost fully describe the operation of the system: OAK's reaction to user-input goals; and OAK's reaction to system state change. The primary intelligent components that enable OAK to accomplish these use-cases are a model-based reasoning engine and a planner.

To perform the diagnostic phase of the control cycle, OAK control agents continually update their states using the model-based reasoning engine, and pass these state updates to other control agents that are interested so that these control agents may update their states. In response to these states or to the system's environment, an external actor or an OAK control agent will provide goals to the OAK system, which are distributed for further processing.

FIG. 1 illustrates one example of a logical OAK hierarchy. The circles 10 represent control agents, and the diamonds 12 represent hardware. The connecting lines represent parent-child control agent relationships 14 and connections to hardware 16. User-defined goals flow down the hierarchy while component states generally flow upwards in the hierarchy.

While a hierarchical topology is the topology that is presented herein, the OAK architecture does not preclude other topologies. Other topological possibilities include: peer-to-peer, where each control agent communicates facts and goals to any other; multi-hierarchy, where there exist multiple loosely coupled hierarchies; and a star topology, or one-level hierarchy. For the rest of this discussion a hierarchical topology is assumed.

Each control agent has an associated Control agent Communication Broker (ACB), which is responsible for handling all of the control agent's communication with a control agent Communication Framework (ACF). The ACB maintains a queue of messages coming into the control agent. Additionally, any control agent that has direct communication with hardware has a control mediator (CM) to handle the hardware level goals that are generated by these control agents for the associated hardware, and to receive updates about this hardware. These messages are not handled by the ACF. By using this layered approach, control agents are decoupled from the ACF.

The Control Agent Communication Language (ACL) of OAK provides several message templates, including messages for queries, state updates, subscription requests, goals, exceptions, and control agent coordination. To protect information, each control agent's ACB may optionally have an information access matrix that determines which control agents are allowed to subscribe to that control agent's events. The ACF allows any control agent to communicate directly with any other control agent. Thus, communication between control agents is not restricted to any logical hierarchical framework. The ACF also supports message logging.

One of the major use-cases of OAK is to react to goals entered by an external actor. These are system-level commands which have the potential of transitioning the entire multicontrol agent system from one state to another.

OAK communicates with external actors via a graphical interface, which is also decoupled from the rest of the system. Goals that are entered from an external actor, such as a human operator, through this interface are sent directly to a root level control agent using a goal message. This control agent develops a plan with goals that apply to the domains of its child control agents. Goals have a priority associated with them, which is used for goal preemption.

After the root level control agent develops a plan and directs a goal to one of its child control agents, the goal is received by the child control agent's ACB, sorted into its queue, and eventually accepted by the control agent for processing. This control agent develops a plan to implement the goal. Since this control agent is a root of its own tree, the goals developed by its planner are passed to its children control agents. This propagation continues until leaf control agents at the hardware level receive goals for their specific domains.

Once goals are received at the leaf level, a similar process occurs in that a plan is developed and goals are passed out of the control agent. The only difference is that the goals are now passed to the control agent's control mediator (CM), which translates the goal into commands that a hardware driver can understand. The CM has a queue of such commands in case the control agent is able to generate commands more quickly than the CM is able to deliver them. Since the CM is the only component that has direct interaction with the hardware drivers, it is the only component that has to be updated when hardware itself is changed or when hardware drivers are updated.

Successful goal implementation implies a state change, so a control agent does not have to set up callbacks with the hardware to confirm that a command was successful. Leaf control agents are already required to monitor the hardware they control for changes in order to accomplish the second major use-case of OAK. Therefore, the leaf control agent waits for a reaction from the hardware monitors to indicate that the command has been successful. The control agent is then free to pass out goals that were temporally dependent on the goal just implemented. Since state changes are propagated up the hierarchy (as well as to unrelated control agents, potentially), control agents at higher levels are also informed that their goals were implemented and they can then pass out goals that had to be put in a wait state. To an implementer of OAK, this means that the incoming goal use-case and the state change use-case, which comprise the two major functions of OAK, are decoupled.

To appropriately handle changes in the state of the system, OAK uses a model-based reasoning engine (MBRE). Recall that in OAK, any control agent may subscribe to another control agent's events (which are triggered by state changes) assuming that it has permission. The control agent most likely to be interested, however, is the control agent's parent, because the state of its children are reflected as variables in its model. For this reason, parents will subscribe to most of their children's state change events. The external actor's control agent may also subscribe to any control agent's state change events, so that the user can be advised of a state change at any level in the hierarchy.

State change events are transmitted through the use of a fact message. This message contains a representation of the knowledge contained in a control agent. Once a fact message is received, the control agent, using the MBRE, determines whether or not the change is important enough to warrant a state change. If the state changes, all subscribed control agents are informed, and propagation of state changes begins as discussed above. Note that since many control agents may subscribe to an event, state changes may be propagating in several subtrees at any given time.

One of OAK's strengths is realized in a control agent's ability to determine the state of its model, compare that state to a knowledge base, and reactively plan. Thus, a control agent can autonomously control its domain until a control agent that is higher in the hierarchy (or in the case of the root control agent, the external actor's control agent) preempts its control. The component of OAK that controls reactive planning is called the reactive manager.

There are two types of information in the reactive manager: persistent goals and emergency conditions. Persistent goals are simply goals that are desired true for the duration of the control agent. An emergency condition is defined as a state transition that cannot be reversed and requires OAK to act immediately to protect the resident system. When OAK detects an emergency, it will preempt the external actor's goal and go to a predetermined goal that will minimize damage to the system being modeled. This goal will be implemented until the actor enters a goal with 'preempt' priority. From this point on, goals from the user are implemented as completely as possible based on the damage to the system.

As mentioned above, when a control agent receives a goal it must use a planning mechanism to create a viable plan to achieve that goal. The plan is in a format of an ordered sequence of fragments. Each fragment is comprised of one or more subgoals. The idea is that within a fragment each subgoal may be accomplished in parallel, while subgoals in a fragment prior to a given fragment must be completed before the current fragment may be attempted.

Several different planners may be appropriate for different control agents depending on how complex they are, what domain they are planning for, etc. Therefore, the planner is instantiated at run-time differently for each control agent from a group of developed planners. To date, two planners have been developed: the Scripted Planner and the highly specialized Graph-Based Planner.

The scripted planner is extremely simple but useful for simple control agents, such as so-called leaf control agents. The scripted planner originally matched the incoming goal with a pre-defined list of incoming goals, and output a pre-defined plan. A later extension to the scripted planner allowed matching on the incoming goal and a propositional logic expression about the current world-state. For example, Goal A along with (variable1=value1) A (variable2#value2) would generate plan A. Many different propositional expressions, and therefore plans, could be associated with each incoming goal. Also, since the scripts are checked in a specific pre-defined order, a simple priority of outputted plans can be imposed. Therefore, with these simple, essentially rule-based scripts, complex behavior could be created.

The graph-based planner has been designed specifically for the test domain described below. Test domain planning comprised determining how to move flow from a source to several sinks through a dynamic pipe network, with many operational constraints. This planner represented the target domain as a loadable model. The model was represented internally as a digraph, with weights on each edge set according to the operational constraints. The planner operated by performing Prim's Minimum Spanning Tree algorithm on the graph to determine how to get flow to as many of the desired sinks as possible. Along the way, the software determined the actions the control agent would need to take to align the system in the manner that Prim's algorithm output. Finally, the planner would generate a plan based on the actions determined.

OAK is a system of collaborative model-based control agents used for control. OAK's greatest strength is realized in a control agent's ability to determine the state of its model, compare that state to its current goal, and reactively plan. Thus, a control agent autonomously controls its domain.

Referring again to FIG. 1, each control agent performs reasoning and planning at various levels of abstraction on its own virtual machine. This allows for logical distribution of time-intensive operations like planning. A higher-level control agent, $A_1$ for example, will develop a relatively abstract plan for accomplishing some goal without having to worry about its implementation. Instead, each goal in that plan is passed to lower level control agents that further decompose the details of that goal. This propagation continues with plans becoming increasingly detailed until they reach control agents ($A_{111}, A_{112}, A_{113}$) that can translate the goals directly into hardware commands. It is important to note that while this architecture implies a hierarchical planning structure, the planning at individual levels is not restricted to the Hierarchical Task Planning approach. This design also allows for a high degree of modularity, since control agents that have the same interface can replace each other.

Figure 2:
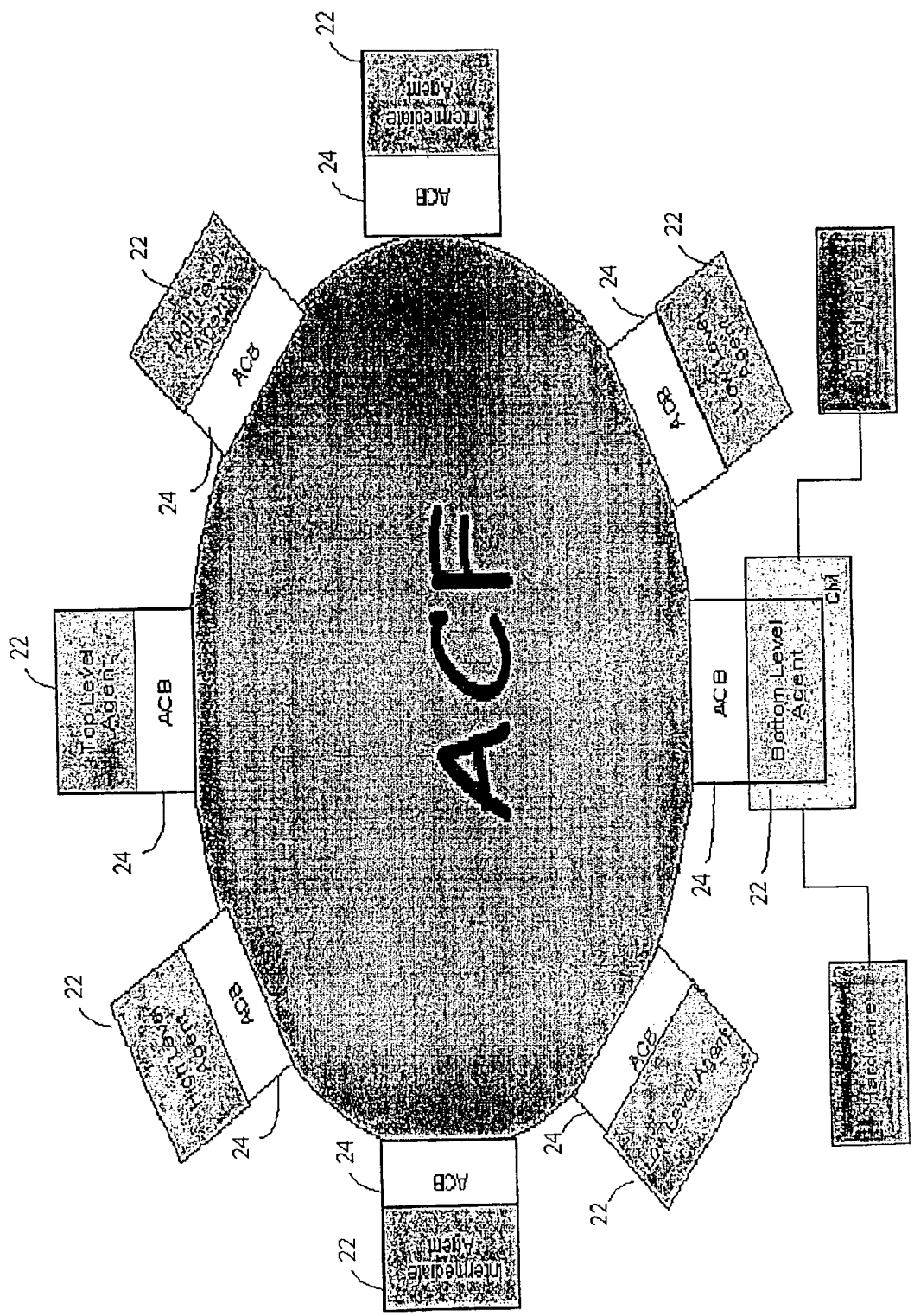
FIG. 2 illustrates a sample OAK communication network of control agents.

FIG. 2 illustrates a sample OAK communication network of control agents. Communication is not limited to the logical channels shown in FIG. 1. Rather, any control agent 22 may communicate to any other control agent 22 via its Agent Communication Broker (ACB) 24, through the Agent Communication Framework (ACF) 26. Thus, any control agent may subscribe to any other control agent's notifications. Control agents are associated with subsystems or high level models. Each type of control agent may operate with data and goals provided by other control agents. Within OAK, each control agent associated with a subsystem provides closed-loop subsystem management using sensed parameters to infer system state. The control agents can adjust control commands to achieve a desired operating profile and/or respond to external events or component failure. Each control agent can communicate state information and goals to other control agents using a "publish and subscribe" mechanism to limit bandwidth usage.

Each control agent in an OAK architecture continually performs a cycle of mode estimation, planning, and execution that is influenced by observed subsystem state and received goals. This cycle is implemented using various manager components in each control agent.

Figure 3:
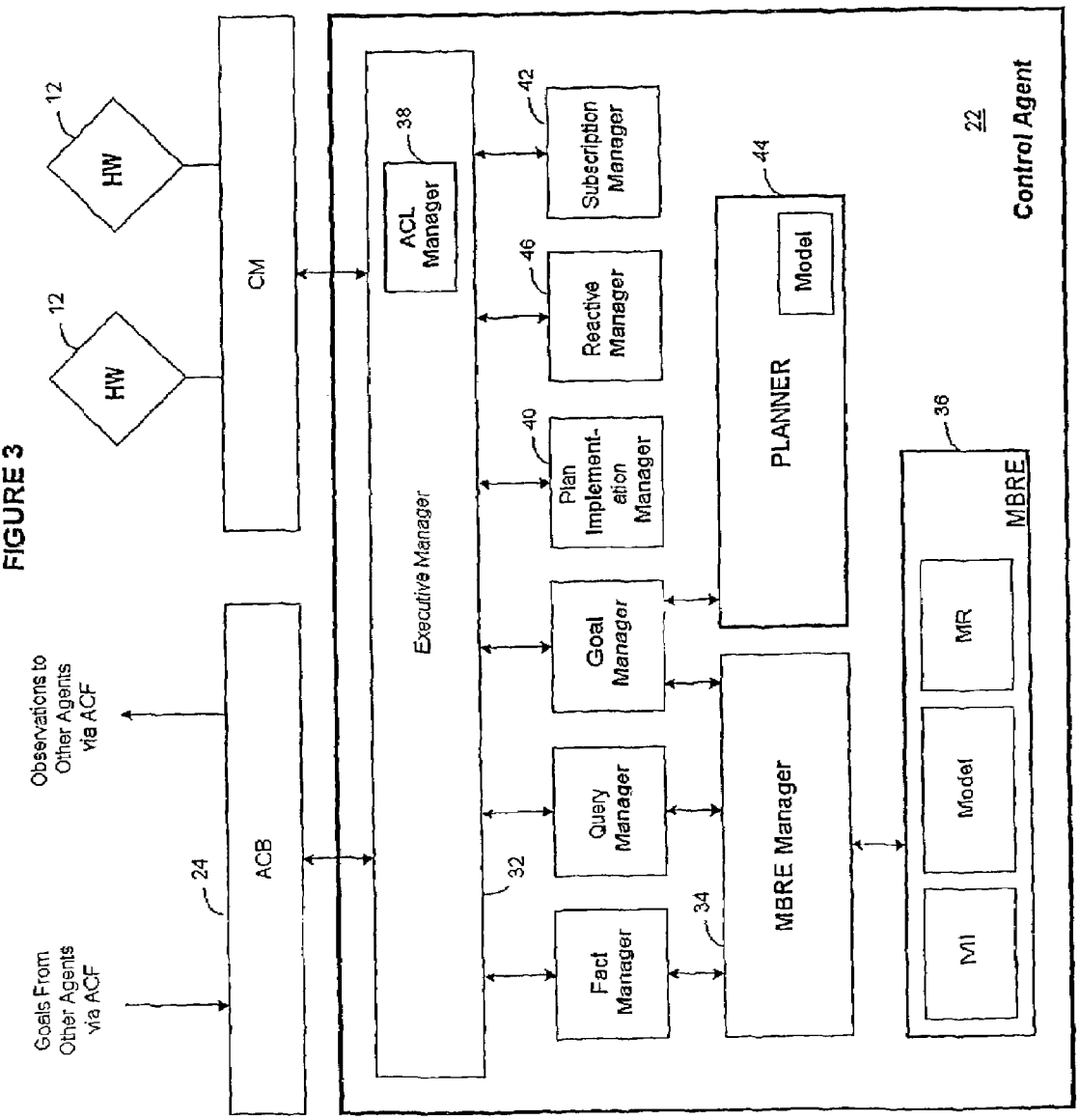
FIG. 3 illustrates the architecture of a control agent within OAK.

The architecture of a control agent 22 is illustrated in FIG. 3. Control agent architecture includes managers for each major step in the functioning of the control agent.

The executive manager 32 acts as a gateway (analogous to OSI level 6) for the control agent 22. It is responsible for decoding and executing incoming messages, as well as encoding outgoing messages. As such, it is the only manager that communicates directly with the ACB 24. The ACB 24 communicates through the ACF 26 to other control agents 22.

OAK control agents attempt to handle large amounts of information in an efficient manner. While the planner is planning for a goal, the control agent can still accept facts and resolve queries. As this is happening, there may be a change in state that may preempt a plan already in progress. Multi-tasking within control agents is handled by making each OAK message object a separate thread.

One type of message object is the query object. Query objects are created when the control agent receives a state query. It interfaces with an MBRE manager, which stores the current state of the model. The query object causes creation of a fact object addressed to the query originator if the queried state is recognizable or an exception if it is not.

Fact objects are another type of message object. In addition to the scenario above, a fact object is created when state updates from other control agents or from associated hardware are received. State updates from other control agents are received via the ACB, and state updates from associated hardware are received via the Control Mediator (CM).

The third type of message object is the goal object. Goal objects are sent from higher level control agents to communicate their desire for this control agent's subsystem. Goal objects interface with the MBRE manager to get the control agent's current state, the Planner to receive the proposed plan, and the plan implementation manager to execute the plan.

The fourth type of message object is the subscription object. These objects contain a reference to a control agent, and a particular state variable that that control agent is interested in. After receiving a subscription object, the receiving control agent will send fact messages to the subscribing control agent whenever the information that it was interested in changes. To this end, the subscription object interfaces with the control agent's subscription manager.

A fifth type of message object is the administrative command object. These objects contain commands that deal with the control agent software's behavior outside the scope of the intelligent control system: things like stopping a control agent, printing debugging messages, or resetting the control agent.

In addition to message objects, there are also seven managers within an OAK control agent. The executive manager 32 routes all of the incoming and outgoing messages for a control agent. The MBRE manager 34 exists solely to store the current state of the model and to interface the query, fact, and goal objects with the model-based reasoning engine (MBRE) 36. The MBRE manager 34 is the component that handles the mode estimation portion of the OAK control cycle. The ACL manager 38 translates each incoming message from the ACL into an object that the control agent can use.

Each incoming goal that results in a successful plan must also communicate with the plan implementation manager (PIM) 40, which ensures that no step of a plan is implemented before each of the previous steps is successful. The PIM 40 corresponds to the execution phase of the OAK control cycle. This manager will have access to a matrix that stores the average transition time for each goal, a multiple of which is added to a constant time to determine the amount of time that the control agent will wait for an action to be performed. This makes the control agents adaptive and can help detect problems with the system early on.

The subscription manager 42 handles subscription requests from other control agents. It stores lists of control agents that are interested in various state changes, and automatically generates fact messages to each of the subscribed control agents when a given state variable changes.

The planner 44 is responsible for deducing plans from the current input goal and the current estimated state. The planner 44 corresponds to the planning phase of the OAK control cycle.

Finally, the reactive manager 46 continually compares the control agent's states to a vector of emergency states and a persistent goal to determine whether or not the control agent's model has entered a state that the developer has identified as abnormal or hazardous. In the event that the reactive manager 46 identifies that the control agent has entered such a state, it pushes out a new goal for the control agent to implement in order to prevent serious damage to the system.

The reactive manager 46 works by having a list of configurations of the system in which the reaction will occur. Each configuration is a propositional expression of facts, and can use the AND, OR, and NOT operators as well as arbitrarily nested parenthesized clauses. Associated with each proposition is a goal. When the control agent's model is in a state that is consistent with one of the configurations, the reactive manager 46 will fire and give the control agent the goal associated with that configuration.

To determine whether or not the system is consistent with one of the listed configurations, the reactive manager 46 will compare the system state to each of the propositions in the list each time the system's state changes. The configurations in the list will have a strict ordering, so some propositions are guaranteed to be checked before others later in the list. If a proposition is consistent with the system state, the associated goal is sent to the executive. This goal will be treated the same as any incoming goal, including preempting the current goal if the precedence of the current goal is sufficiently low. Upon receiving a reactive goal, the executive may send an exception-type message into the ACF.

In addition to emergency states, the reactive manager 46 also stores a persistent goal. This goal will be given by the developer at startup, but may be changed by the system user via special configuration messages during run time. Consistency with the persistent goal is checked before the reactive manager 46 checks for emergency conditions, and if the state is found to be inconsistent, the control agent reacts as described above. The user should not, however, consider leaving the persistent goal's state to be catastrophic, as it is assumed to be in the emergency case.

Mode Estimation (ME) is the process of deducing system states based upon partial or incomplete information. Within the context of OAK, Mode Estimation involves inferring the states of various system components using: first-principles logic-based models, observations gathered from the hardware, and knowledge of past commands issued to the hardware. Internal to a control agent, this capability is provided by the REManager (Reasoning Engine Manager), which uses a single underlying reasoning engine to produce diagnostic estimates or "candidates". These candidates are then converted into fact objects, which are the atomic units of knowledge representation in OAK. Fact objects are passed between control agents, and consequently, between reasoning engines.

Each time a command set is issued to the hardware, or new observations arrive from the hardware in the absence of an explicit command, a state transition occurs and the reasoning engine attempts to determine the most likely candidates (resultant system states). The process of generating candidates comprises a number of steps. First, the reasoning engine generates an expected next state for each component based upon any command information that may be available. Next, the reasoning engine considers all recent observations from the system. A consistency-checking algorithm is then run against the plant model given the new observations. The output from this algorithm is a set of ranked candidates, or state estimates. It is then the responsibility of the external actor who is using the reasoning engine to decide which candidate it wishes to select or "believe".

The reasoning engine supports a number of parameters that are set when the engine is first initialized. These parameters are used to configure the estimation process, and different settings can potentially result in different diagnoses being reached. Table 1 illustrates an example of reasoning engine settings to be used with OAK control agents.

TABLE 1

| Parameter | Setting |
| --- | --- |
| Search engine type | CBFS (Conflict-directed Best First Search) |
| Number of candidates | 3 |
| Maximum number of candidates to search over | 10000 |
| History length | 10 |
| Maximum number of trajectories | 10 |
| Progress style | Full |
| Trajectory tracker type | Extend |

OAK receives high level goals from an external actor and creates an implementation plan for these goals. The implementation is carried out by a plurality of control agents in a distributed manner utilizing model-based reasoning techniques. Moreover, OAK reacts autonomously to changes in the system. The distributed nature of OAK permits the aforementioned functions to be realized in a time efficient manner. In addition, OAK can respond to catastrophic changes in the system environment including damage to the OAK system itself. All subsystems of an OAK system, including the intelligent components, are decoupled from one another wherever possible allowing for many different such subsystems to be utilized. Ultimately, OAK controlled systems reduce manpower requirements which is especially significant in repetitive or dangerous domains.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A system including a processor and a memory for controlling a connection-based system in which a plurality of independently executing control agents are distributed across an agent communication framework, each control agent being associated with a subsystem of the connection-based system wherein each control agent is responsive to other control agents such that connection-based system goals and connection-based system states can be propagated throughout the distributed network of control agents and acted upon to autonomously control the connection-based system, said system comprising:

in the subsystem, hardware components that are subject to component failures;
an agent communication framework that serves as a communication network for the plurality of control agents, wherein
each control agent is comprised of:
an agent communication broker that provides a communication interface between a control agent and the agent communication framework;
a model based reasoning engine (MBRE) communicable with the agent communication broker, the MBRE being based on failure sensitive component models of the hardware components that include
(i) physical properties based models on the hardware components, and
(ii) failure states of the hardware components,
wherein the MBRE estimates a component failure based subsystem state based on data gathered from the hardware components and knowledge of the past commands issued to said hardware components; and
a planner communicable with the agent communication broker and the model based reasoning engine that generates a reconfiguration plan for the implementation of a specific goal based on input including the specific goal and the subsystem state, and
wherein each control agent propagates commands for achieving the specific goal that are issued to associated hardware components.

2. The system of claim 1 wherein at least one control agent is communicable with an external actor that provides a system level goal to initiate connection-based system-wide control.

3. The system of claim 2 wherein a control agent is communicable with at least one hardware component within the control agent's subsystem via a control mediator that provides an interface between the control agent and the hardware's device controller.

4. The system of claim 3 wherein said control agent is further comprised of:
an executive manager communicable with the agent communication broker that routes incoming and outgoing messages for the control agent;
an ACL manager communicable with the executive manager for translating incoming messages into message objects, wherein message objects include a query object having data pertaining to subsystem status queries, a fact object having data pertaining to subsystem state updates, a goal object having data pertaining to the goal of a control agent, and a subscription object having data pertaining to another control agent that is interested in the status of the present control agent;
a model-based reasoning engine manager communicable with the executive manager, said model-based reasoning engine manager for storing the current state of a subsystem model; and communicating query, fact, and goal objects between the model-based reasoning engine and executive manager;
a plan implementation manager communicable with the executive manager for implementing a plan generated by the planner;
a subscription manager communicable with the executive manager for maintaining a list of other control agents authorized to receive messages from the present control agent handling requests from other control agents and generating fact message objects pertaining to subsystem state changes to said other control agents.

5. The system of claim 4 wherein said control agent is further comprised of a reactive manager communicable with the executive manager for monitoring and comparing the current control agent's state against a set of emergency states and a persistent goal to determine whether the current control agent's model has entered an abnormal or hazardous state, wherein when the reactive manager determines that a control agent's model has entered an abnormal or hazardous state, said reactive manager generates a new pre-emptive goal for the control agent to implement in order to prevent damage to the connection-based system.

* * * * *